United States Patent
Wildschek et al.

(10) Patent No.: US 12,028,837 B2
(45) Date of Patent: Jul. 2, 2024

(54) SIDELINK BEAM INFORMATION SENSING AND TRANSMISSION

(71) Applicant: Nokia Technologies Oy, Espoo (FI)

(72) Inventors: Torsten Wildschek, Gloucester (GB); Daniel Medina, Munich (DE); Nuno Manuel Kiilerich Pratas, Gistrup (DK); Ling Yu, Kauniainen (FI); Jun Tan, Glenview, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 95 days.

(21) Appl. No.: 17/487,015

(22) Filed: Sep. 28, 2021

(65) Prior Publication Data
US 2023/0097745 A1    Mar. 30, 2023

(51) Int. Cl.
*H04W 72/20* (2023.01)
*H04W 16/28* (2009.01)
*H04W 72/02* (2009.01)
*H04W 72/044* (2023.01)
*H04W 80/02* (2009.01)

(52) U.S. Cl.
CPC ........... *H04W 72/02* (2013.01); *H04W 16/28* (2013.01); *H04W 72/046* (2013.01); *H04W 72/20* (2023.01); *H04W 80/02* (2013.01)

(58) Field of Classification Search
CPC ... H04W 72/02; H04W 16/28; H04W 72/046; H04W 72/20; H04W 80/02
See application file for complete search history.

(56) References Cited

U.S. PATENT DOCUMENTS

| | | | | |
|---|---|---|---|---|
| 2020/0236656 | A1* | 7/2020 | Cao | H04W 80/02 |
| 2020/0275425 | A1* | 8/2020 | Cao | H04L 1/0003 |
| 2020/0374858 | A1* | 11/2020 | Vargas | H04B 7/0617 |
| 2020/0396716 | A1* | 12/2020 | Li | H04W 72/0446 |
| 2021/0176735 | A1 | 6/2021 | Deng et al. | |
| 2021/0219268 | A1* | 7/2021 | Li | H04W 72/20 |
| 2021/0352625 | A1* | 11/2021 | Akkarakaran | H04B 7/06954 |

(Continued)

FOREIGN PATENT DOCUMENTS

WO    2020/033622 A1    2/2020

OTHER PUBLICATIONS

"3rd Generation Partnership Project; Technical Specification Group Radio Access Network; NR; Multiplexing and channel coding (Release 16)", 3GPP TS 38.212, V16.6.0, Jun. 2021, pp. 1-153.

(Continued)

*Primary Examiner* — Lakeram Jangbahadur
(74) *Attorney, Agent, or Firm* — SQUIRE PATTON BOGGS (US) LLP

(57) ABSTRACT

A user equipment includes at least one processor and at least one memory including computer program code. The at least one memory and the computer program code are configured to, with the at least one processor, cause the user equipment to: select radio resources for a first sidelink transmission to a first user equipment based on sidelink control information from a second user equipment, the sidelink control information including at least beam information for a second sidelink transmission by the second user equipment; and perform the first sidelink transmission to the first user equipment on the selected radio resources.

6 Claims, 5 Drawing Sheets

(56) References Cited

U.S. PATENT DOCUMENTS

2022/0070779 A1\* 3/2022 Li ............................ H04W 4/40
2022/0070848 A1\* 3/2022 Liu ...................... H04W 72/046

OTHER PUBLICATIONS

"3rd Generation Partnership Project; Technical Specification Group Radio Access Network; NR; Physical layer procedures for data (Release 16)", 3GPP TS 38.214, V16.6.0, Jun. 2021, pp. 1-172.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-38.

"3rd Generation Partnership Project; Technical Specification Group Radio Access Network; NR; Physical layer procedures for control (Release 16)", 3GPP TS 38.213, V16.6.0, Jun. 2021, pp. 1-187.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

Ali et al., "3GPP NR V2X Mode 2: Overview, Models and System-Level Evaluation", IEEE Access, vol. 9, Jun. 21, 2021, pp. 89554-89579.

Lien et al., "3GPP NR Sidelink Transmissions Toward 5G V2X", IEEE Access, vol. 8, Feb. 13, 2020, pp. 35368-35382.

Griffith et al., "Physical Sidelink Control Channel (PSCCH) in Mode 2: Performance Analysis", IEEE International Conference on Communications (ICC), May 21-25, 2017, 7 pages.

\* cited by examiner

SIDELINK BEAM INFORMATION SENSING AND TRANSMISSION

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the 3rd Generation Partnership Project (3GPP). These standards are known as 3GPP New Radio (NR) standards.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

One or more example embodiments may enable spatial resource reuse for sidelink (SL) transmissions without requiring user equipment (UEs) to implement an inter-UE coordination framework.

At least one example embodiment provides a user equipment comprising: at least one processor and at least one memory including computer program code. The at least one memory and the computer program code are configured to, with the at least one processor, cause the user equipment to: select radio resources for a first sidelink transmission to a first user equipment based on sidelink control information from a second user equipment, the sidelink control information including at least beam information for a second sidelink transmission by the second user equipment; and perform the first sidelink transmission to the first user equipment on the selected radio resources.

At least one example embodiment provides a user equipment comprising: means for selecting radio resources for a first sidelink transmission to a first user equipment based on sidelink control information from a second user equipment, the sidelink control information including at least beam information for a second sidelink transmission by the second user equipment; and means for performing the first sidelink transmission to the first user equipment on the selected radio resources.

At least one example embodiment provides a method for sidelink transmission from a first user equipment to a second user equipment, the method comprising: selecting, at the first user equipment, radio resources for a first sidelink transmission to the second user equipment based on sidelink control information from a third user equipment, the sidelink control information including at least beam information for a second sidelink transmission by the third user equipment; and performing the first sidelink transmission from the first user equipment to the second user equipment on the selected radio resources.

At least one example embodiment provides a non-transitory computer-readable storage medium storing computer-executable instructions that, when executed by at least one processor at a first user equipment, cause the first user equipment to perform a method for sidelink transmission from the first user equipment to a second user equipment, the method comprising: selecting, at the first user equipment, radio resources for a first sidelink transmission to the second user equipment based on sidelink control information from a third user equipment, the sidelink control information including at least beam information for a second sidelink transmission by the third user equipment; and performing the first sidelink transmission from the first user equipment to the second user equipment on the selected radio resources.

According to one or more example embodiments, the beam information may include at least one of beam width or beam direction for the second sidelink transmission.

The sidelink control information may be included in at least one of first stage sidelink control information, second stage sidelink control information, or a MAC control element.

The sidelink control information may include at least one of beam width or beam direction for the second sidelink transmission.

The sidelink control information may include beam width and beam direction for the second sidelink transmission, and the beam width and beam direction for the second sidelink transmission may be encoded in a beam width and direction field of the sidelink control information. The sidelink control information that may be implicitly or explicitly associated with beam width and beam direction for the second sidelink transmission.

The sidelink control information may include the beam direction for the second sidelink transmission, and the beam direction may be in one or two dimensions.

The second stage sidelink control information may include position information for the second user equipment, and the position information may be indicated by a Zone ID field of the second stage sidelink control information.

The at least one memory and the computer program code may be configured to, with the at least one processor, cause the user equipment to: receive position information for the first user equipment; and select the radio resources based on the sidelink control information and the position information for the first user equipment.

The at least one memory and the computer program code may be configured to, with the at least one processor, cause the user equipment to: receive beamforming and interference cancelation capability information for the first user equipment; and select the radio resources based on the sidelink control information and the beamforming and interference cancelation capability information.

The second sidelink transmission may be from the second user equipment to a third user equipment.

At least one example embodiment provides a user equipment comprising: at least one processor and at least one memory including computer program code. The at least one memory and the computer program code are configured to, with the at least one processor, cause the user equipment to transmit sidelink control information to another user equipment, the sidelink control information including at least beam information for a sidelink transmission by the user equipment.

At least one example embodiment provides a method comprising: transmitting sidelink control information from a user equipment to another user equipment, the sidelink control information including at least beam information for a sidelink transmission by the user equipment.

At least one example embodiment provides a non-transitory computer-readable storage medium storing computer-executable instructions that, when executed by at least one processor at a user equipment, cause the user equipment to perform a method comprising: transmitting sidelink control information from the user equipment to another user equipment, the sidelink control information including at least beam information for a sidelink transmission by the user equipment.

At least one example embodiment provides a user equipment comprising: means for transmitting sidelink control information to another user equipment, the sidelink control information including at least beam information for a sidelink transmission by the user equipment; and means for transmitting data to the other user equipment.

The beam information may include at least one of beam width or beam direction for the sidelink transmission by the user equipment.

The sidelink control information may be included in at least one of first stage sidelink control information, second stage sidelink control information or a MAC control element.

The sidelink control information may include at least one of beam width or beam direction for the sidelink transmission.

The sidelink control information may include beam width and beam direction for the sidelink transmission, and the beam width and beam direction for the sidelink transmission may be encoded in a beam width and direction field of the sidelink control information.

The sidelink control information may include the beam direction for the sidelink transmission, and the beam direction may be in one or two dimensions.

The second stage sidelink control information may include position information for the user equipment.

The position information may be indicated by a Zone ID field of the second stage sidelink control information.

At least one other example embodiment provides a user equipment comprising: at least one processor and at least one memory including computer program code. The at least one memory and the computer program code are configured to, with the at least one processor, cause the user equipment to: estimate a sidelink reference signal receive power at a first user equipment, the sidelink reference signal receive power being for at least a first sidelink transmission from a second user equipment to the first user equipment; select radio resources for a second sidelink transmission from the user equipment to the first user equipment based on the estimated sidelink reference signal receive power and a reference signal receive power threshold; and perform the second sidelink transmission to the first user equipment on the selected radio resources.

At least one other example embodiment provides a user equipment comprising: means for estimating a sidelink reference signal receive power at a first user equipment, the sidelink reference signal receive power being for at least a first sidelink transmission from a second user equipment to the first user equipment; means for selecting radio resources for a second sidelink transmission from the user equipment to the first user equipment based on the estimated sidelink reference signal receive power and a reference signal receive power threshold; and means for performing the second sidelink transmission to the first user equipment on the selected radio resources.

At least one other example embodiment provides a method comprising: estimating, by a first user equipment, a sidelink reference signal receive power at a second user equipment, the sidelink reference signal receive power being for at least a first sidelink transmission from a third user equipment to the second user equipment; selecting radio resources for a second sidelink transmission from the first user equipment to the second user equipment based on the estimated sidelink reference signal receive power and a reference signal receive power threshold; and performing the second sidelink transmission from the first user equipment to the second user equipment on the selected radio resources.

At least one example embodiment provides a non-transitory computer-readable storage medium storing computer-executable instructions that, when executed by at least one processor at a user equipment, cause the user equipment to perform a method comprising: estimating a sidelink reference signal receive power at a first user equipment, the sidelink reference signal receive power being for at least a first sidelink transmission from a second user equipment to the first user equipment; selecting radio resources for a second sidelink transmission from the user equipment to the first user equipment based on the estimated sidelink reference signal receive power and a reference signal receive power threshold; and performing the second sidelink transmission to the first user equipment on the selected radio resources.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a user equipment (UE), it should be understood that one or more example embodiments discussed herein may be performed by one or more processors (or processing circuitry) at the applicable device. For example, according to one or more example embodiments, at least one memory may include or store computer program code, and the at least one memory and the computer program code may be configured to, with at least one processor, cause the UE to perform the operations discussed herein.

As discussed herein, the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, a vehicle including a vehicular communication system, or the like.

As discussed herein, transmission resources may also be referred to as radio or cellular resources for transmitting, and may include, for example, time and/or frequency resources for transmitting information and/or data between devices.

It will be appreciated that a number of example embodiments may be used in combination.

Figure 1:
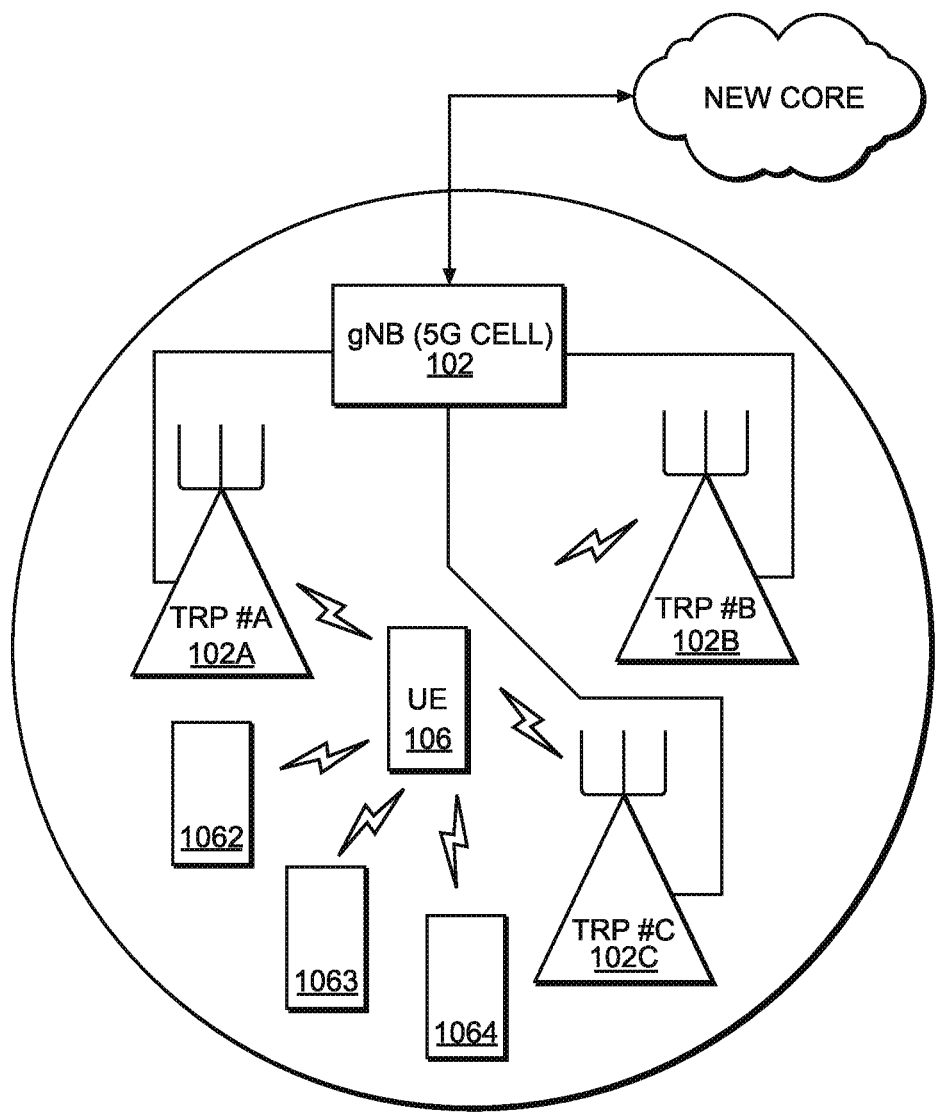
FIG. 1 illustrates a simplified diagram of a portion of a 3rd Generation Partnership Project (3GPP) New Radio (NR) access deployment for explaining example embodiments.

FIG. 1 illustrates a simplified diagram of a portion of a 3rd Generation Partnership Project (3GPP) New Radio (NR) access deployment for explaining example embodiments.

Referring to FIG. 1, the 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for UEs (e.g., UEs 106, 1062, 1063, 1064) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with UEs 106, 1062, 1063, and 1064. The UEs 106, 1062, 1063 and 1064 are configured to communicate (e.g., directly) with one another via sidelink communication, which is discussed in more detail later. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only UEs 106, 1062, 1063, and 1064 are shown in FIG. 1, the gNB 102 and TRPs 102A, 102B, 102C may provide communication services to a relatively large number of UEs within the coverage area of the TRPs 102A, 102B, 102C.

For the sake of clarity of example embodiments, communication services (including transmitting and receiving radio signals) may be discussed with regard to one or more of the UEs 106, 1062, 1063, and 1064. As discussed herein, the UEs 106, 1062, 1063, and 1064 may be referred to as first UE 106, second UE 1062, third UE 1063 and fourth UE 1064. However, it should be understood that the use of first, second, third and fourth in this context is solely for the purposes of more easily differentiating between the UEs.

Sidelink (SL) is a communication paradigm in which UEs are able to communicate without relaying data via the network. SL communication uses communication periods that are periodic in the time domain Each SL period includes instances of a Physical Sidelink Control Channel (PSCCH), which carries signaling traffic (control information) and a Physical Sidelink Shared Channel (PSSCH), which primarily carries data.

During 3rd Generation Partnership Project (3GPP) release 16 (Rel-16) New Radio (NR), sidelink (SL) was designed to facilitate UE communication with other nearby UEs via direct/SL communication. In Rel-16, two resource allocation modes are specified, and a SL Tx UE is configured with one of the two resource allocation modes to perform NR SL transmissions to other UEs within range. These modes are denoted as NR SL mode 1 or NR SL mode 2.

In NR SL mode 1, a SL transmission resource is assigned by the network (e.g., the gNB) to the SL Tx UE. In this case, the configuration and operation are similar to configuration and operation over the Uu interface. The MAC level details of this procedure are given in section 5.8.3 of 3GPP TS 38.321.

In NR SL mode 2, the SL Tx UE autonomously selects the SL transmission resources for SL transmission to other UEs. In this case, the SL Tx UE performs autonomous resource selection with the aid of a sensing procedure. More specifically, the SL Tx UE performs a sensing procedure over the configured one or more SL transmission resource pool(s) to obtain knowledge of the resource(s) reserved by other nearby SL Tx UE(s). The SL Tx UE may then select SL transmission resource(s) from the available SL transmission resources based on the knowledge obtained from the sensing.

In order for a SL UE to perform sensing and obtain the necessary information to receive a SL transmission, the SL UE needs to decode the SCI. In Rel-16, the SCI associated with a data transmission includes fields, which are transmitted in two stages. The first stage (1st-stage) SCI is conveyed by the PSCCH, while the second stage ($2^{nd}$ stage) SCI is conveyed using PSSCH resources.

The 1st-stage SCI mainly carries the information regarding the PSSCH resources and the information for decoding the $2^{nd}$ stage SCI, which are mainly used for channel sensing purposes to be decodable by any UE. The $2^{nd}$ stage SCI mainly carries the remaining scheduling information for PSSCH decoding by the SL Rx UE. The contents of the $1^{st}$ stage SCI and $2^{nd}$ stage SCI are currently standardized in 3GPP TS 38.212. The current $2^{nd}$ stage SCI formats are shown below:

| SCI format 2-A | SCI format 2-B |
|---|---|
| HARQ process number-4 bits. New data indicator-1 bit. Redundancy version-2 bits as defined in Table 7.3.1.1.1-2. Source ID-8 bits as defined in clause 8.1 of [6, TS 38.214]. Destination ID-16 bits as defined in clause 8.1 of [6, TS 38.214]. HARQ feedback enabled/disabled indicator-1 bit as defined in clause 16.3 of [5, TS 38.213]. Cast type indicator-2 bits as defined in Table 8.4.1.1-1 and in clause 8.1 of [6, TS 38.214]. CSI request-1 bit as defined in clause 8.2.1 of [6, TS 38.214] and in clause 8.1 of [6, TS 38.214]. | HARQ process number-4 bits. New data indicator-1 bit. Redundancy version-2 bits as defined in Table 7.3.1.1.1-2. Source ID-8 bits as defined in clause 8.1 of [6, TS 38.214]. Destination ID-16 bits as defined in clause 8.1 of [6, TS 38.214]. HARQ feedback enabled/disabled indicator-1 bit as defined in clause 16.3 of [5, TS 38.213]. Zone ID-12 bits as defined in clause 5.8.11 of [9, TS 38.331]. Communication range requirement-4 bits determined by higher layer parameter sl-ZoneConfigMCR-Index. |

Table: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

The fields defined in each of the $2^{nd}$ stage SCI formats are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

SCI format 2-A is used for the decoding of the PSSCH, with Hybrid Automatic Repeat Request (HARQ) operation when HARQ-ACK information includes ACK or NACK, when HARQ-ACK information includes only NACK, or when there is no feedback of HARQ-ACK information.

SCI format 2-B is used for the decoding of the PSSCH, with HARQ operation when HARQ-ACK information includes only NACK, or when there is no feedback of HARQ-ACK information.

In more detail, conventionally, in NR SL mode 2, each SL Tx UE may autonomously select transmission resources by decoding the PSSCH (and SCI) and performing reference signal received power (RSRP) measurement of (e.g., configured or pre-configured) resource pool(s) based on the following procedure, which is described in section 8.1 of 3GPP TS 38.214.

First, based on command(s) from higher layers, the UE determines a candidate resource pool. Also, a sensing window interval is defined in which the UE monitors the resources, except those of its own transmissions. The UE collects a set $S_A$ of potential candidate single-slot resources that are within a defined selection window period and excludes slots which (i) the UE has not monitored during the sensing period; and (ii) the decoded SCI format 1-A indicates that the candidate resource is reserved and the received RSRP is above a RSRP threshold RSRPthreshold.

If the number of remaining single slot candidates is greater than $|0.2S_A|$, then the UE forwards the potential candidate slots to higher layers for final transmission resource selection. Otherwise, the UE increases the RSRP threshold RSRPthreshold by 3 dB (RSRPthreshold=RSRPthreshold+3) and repeats the procedure. Once determined, final candidate slots are then forwarded to higher layers for final resource selection.

The NR SL mode 2 resource allocation scheme described above is based on a SL Tx UE sensing the resource pool to determine which resources are available to be used for future transmission. The sensing, as defined in 3GPP Rel-16, is based on the assumption that a SL Tx UE is able to listen from all directions; there is no directionality or receiver beamforming applied during the sensing.

With beam-based SL transmission, however, the UE-autonomous resource allocation (NR SL mode 2) based on sensing by only the SL Tx UE may perform relatively poorly.

In the approved 3GPP Rel-17 WI NR_SL_enh, SL resource allocation enhancement for NR SL mode 2 has been identified as an objective, in which inter-UE coordination is set to be studied for enhanced reliability and reduced latency.

In an inter-UE coordination scenario (denoted in 3GPP as Inter-UE Coordination Scheme 1), a SL receiving UE (SL Rx UE) selects the preferred SL transmit resource(s) (e.g., according to its sensing), and then recommends the selected resource(s) to the SL Tx UE, where the SL Tx UE selects its SL transmit resource by taking into account the resource(s) indicated by the SL Rx UE, and performing its own sensing. In this case, the SL Tx UE may or may not use the recommended resource(s) to transmit to the SL Rx UE. Thus, by using the inter-UE coordination scheme, the SL Rx UE may try to ensure there is no packet collision or strong interference over its selected resource(s), and thus, the transmission from SL Tx UE to SL Rx UE may occur with high(er) reliability.

Inter-UE Coordination may help alleviate the above-noted poor performance for beam-based SL transmission by taking into account the conditions at the SL Rx UE. However, not all UEs are expected to support 3GPP Rel-17 inter-UE coordination because (i) inter-UE coordination may be deemed an optional feature or (ii) because 3GPP Rel-16 legacy UEs may be deployed to operate in Frequency Range 2 (FR2). Therefore, inter-UE coordination may not be available to assist with SL resource allocation, and the relatively poor performance for beam-based SL transmission may persist.

With reference to the access deployment shown in FIG. 1, for example, consider a scenario in which the second UE 1062 is a 3GPP Rel-18 UE, which supports FR2 and beam-based SL transmission, but not inter-UE coordination. In this deployment scenario, the resource utilization in the pool may be relatively high, and thus, for transmission towards the second UE 1062, the first UE 106 must reuse time and frequency resources, which are already being used by other nearby beam-based transmissions by other UEs (e.g., the third UE 1063 and the fourth UE 1064) (spatial reuse). If the first UE 106 senses transmission by the third UE 1063, then based on the 3GPP Rel-16 sensing procedure, the first UE 106 would not know the beamwidth, beam direction or position of the third UE 1063, and thus, cannot ascertain if the transmission by the third UE 1063 would indeed affect reception of the transmission by the first UE 106 at the second UE 1062. Consequently, the relatively poor performance for beam-based SL transmission may persist.

One or more example embodiments introduce a new $2^{nd}$ stage SCI format for operation with beam-based SL transmission, wherein the SCI format includes beam information in addition to UE position information. As discussed herein, the beam information may be referred to as SCI beam information may include beam width information (also referred to as beam width, SCI beam width, or SCI beam width information) and/or beam direction information (also referred to as beam direction, SCI beam direction or SCI beam direction information). Beam width information may also be related to a UE specific radiation pattern and/or antenna radiation pattern. The value of beam width information may be explicitly or implicitly used to indicate a specific beam spatial filter, a radiation pattern, an antenna phase configuration for transmission, or other antenna transmission related parameters.

According to one or more example embodiments, the new $2^{nd}$ stage SCI format (e.g., separate from the conventional $2^{nd}$ stage SCI formats) including new fields as discussed herein. As an alternative, however, one or more existing $2^{nd}$ stage SCI formats may be extended to include the fields discussed herein.

Although discussed herein with regard to a $2^{nd}$ stage SCI format, example embodiments should not be limited to this example. Rather, the fields and information discussed herein may be included in a $1^{st}$ stage SCI and/or MAC Control Element (CE) as the containers for the information.

With reference back to the access deployment shown in FIG. 1, consider a scenario in which the first UE 106 is to perform (e.g., beam-based) SL transmission to the second UE 1062 during concurrent beam-based transmission by the third UE 1063 to the fourth UE 1064. In this example, according to one or more example embodiments, when the third UE 1063 performs a beam-based SL transmission (including the $2^{nd}$ stage SCI format described herein), the first UE 106 may predict if the SL transmission by the third UE 1063 to the fourth UE 1064 is likely to interfere with reception of the SL transmission from the first UE 106 at the second UE 1062 based on one or more of:

Beam information in the $2^{nd}$ stage SCI format for the third UE 1063 (which the first UE 106 obtains by sensing);
Location of the third UE 1063 in the $2^{nd}$ stage SCI format for the third UE 1063;
Location of the first UE 106;
Location of the second UE 1062 (e.g., provided in the $2^{nd}$ stage SCI format from the second UE 1062 or by higher layer signaling if the second UE 1062 does not transmit SCI with Zone ID);
Rx beamforming/interference rejection capabilities of the second UE 1062, if available.

The granularity of the beam width information may be configurable (e.g., as part of the resource pool configuration) because (i) typical values may depend on carrier frequency and type of deployed devices (e.g., vehicles in the vehicle-to-everything (V2X) scenario may have different antenna characteristics and hence beam width from devices in an industrial Internet of Things (IoT) scenario); (ii) UE capabilities, and (iii) there is a tradeoff between the signaling overhead and accuracy of interference prediction and hence performance.

The granularity of the beam direction information may depend on the beam width (e.g., narrower beam width may have finer granularity of beam direction). The granularity of the SCI beam direction information may also be configurable (e.g., as part of the resource pool configuration) because there is a tradeoff between the signaling overhead and accuracy of interference prediction and performance.

Since the granularity of the beam direction information may depend on the beam width, joint encoding of these two pieces of information into a single 'Beam width and direction' field may be more efficient. For example, with a field of fixed size jointly encoding both beam width and beam direction, for a narrow beam width, fewer bits may be used to encode the beam width and more bits may be used to encode the beam direction. On the other hand, for a wide beam width, fewer bits may be used to encode the beam direction and more bits may be used to encode the beam width.

In general, beams may be formed in two dimensions (e.g., expressed in azimuth (horizontal plane) and elevation (vertical plane)). In some instances, however, indicating only one dimension in the SCI may be sufficient (e.g., if all UEs involved are expected to be at approximately the same altitude). In other instances, beam width and beam direction in both dimensions may be needed.

With regard to the position or location of a SL UE, if the SL UE requests distance-based HARQ feedback then the position of the SL UE is already encoded in a Zone ID field in the $2^{nd}$ stage SCI format 2-B. The granularity of this Zone ID is configurable and intended for the distance-based HARQ feedback. According to one or more example embodiments, however, a new Zone ID field to indicate the position of a SL Tx UE is added to the $2^{nd}$ stage SCI. Unlike the current Zone ID, the Zone ID field according to one or more example embodiments field has a separate and different configuration of zone granularity.

In more detail, the Zone ID field in the current $2^{nd}$ stage SCI format 2-B is intended for distance-based HARQ feedback and its zone granularity, which is configurable by parameter sl-ZoneLength, may be optimized for that purpose. By contrast, according to one or more example embodiments, the optimal zone granularity is different from that of the optimal zone granularity for the purpose of distance-based HARQ feedback. Consequently, in one example, the Zone ID field according to one or more example embodiments may replace the current Zone ID field in the $2^{nd}$ stage SCI format 2-B, such that the same zone configuration is used for both purposes. In another example, the Zone ID according to one or more example embodiments is included in a separate zone configuration, hence a separate Zone ID field in the SCI.

In some instances, a SL UE may not request HARQ-based feedback, and thus, the Zone ID field may not be available. As an alternative (e.g., in V2X), higher layers may include position information in their messages (e.g., Co-operative Awareness Message (CAM) for ETSI ITS, Basic Safety Message (BSM) for SAE J2735, or the like), and this position information may be reused for beam-based interference prediction at the UE according to one or more example embodiments.

Thus, one or more example embodiments propose the addition of the 'Beam width and direction' field and the 'Zone ID' field to the $2^{nd}$ stage SCI. The 'Beam width and direction' field jointly encodes the beam width and direction, in one or two dimensions, of the SL transmission associated with the $2^{nd}$ stage SCI. The field size may be derived from the resource pool configuration. The 'Zone ID' field indicates the position of the UE transmitting the $2^{nd}$ stage SCI. The field size of the Zone ID, according to one or more example embodiments, may be fixed in a specification or may be configurable as part of the resource pool configuration.

Figure 2:
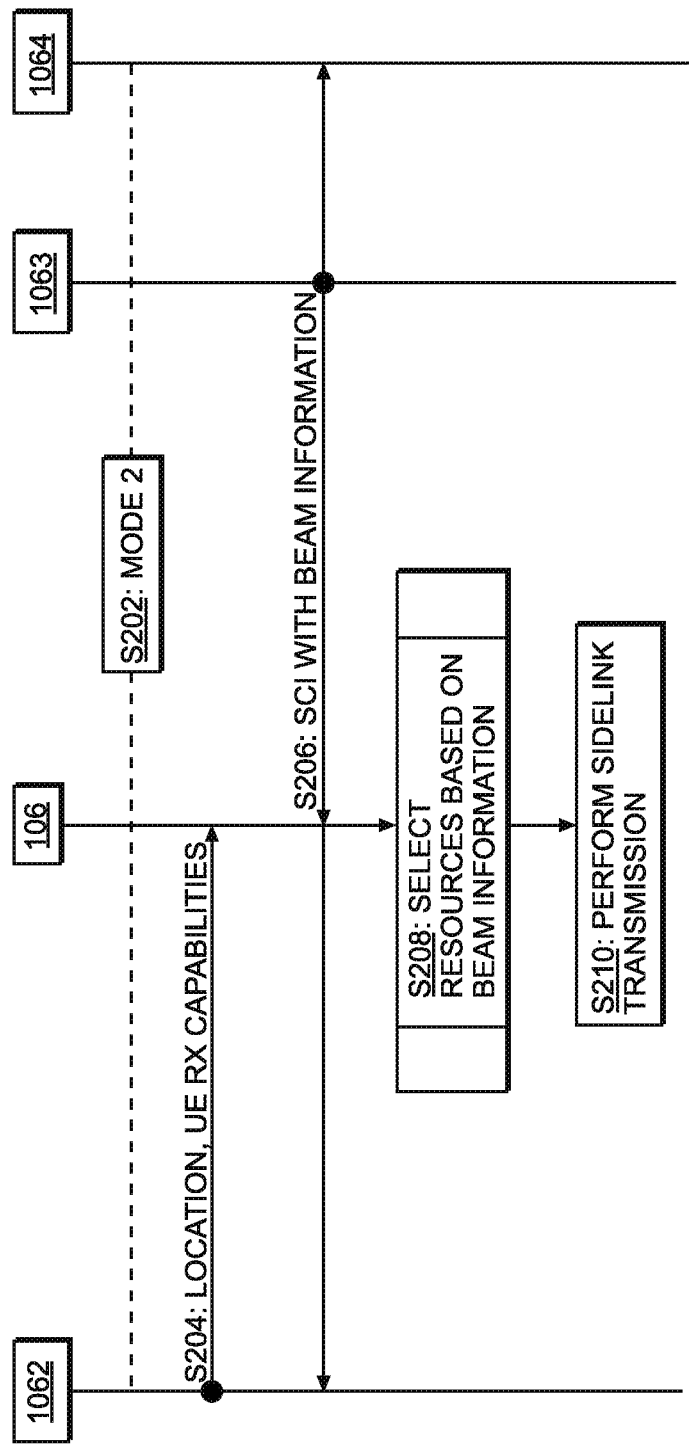
FIG. 2 is a signal flow diagram illustrating a method according to example embodiments.

FIG. 2 is a signal flow diagram illustrating a method according to example embodiments. For example purposes, the example embodiment shown in FIG. 2 will be discussed with regard to the access deployment shown in FIG. 1, and more specifically, with regard to the first UE 106 selecting resources for SL transmission to the second UE 1062 in light of SL transmission by the third UE 1063. However, example embodiments should not be limited to this example.

In the example embodiment shown in FIG. 2, as indicated by S202, UEs 106, 1062, 1063 and 1064 are operating in a resource pool configured for SL mode 2 operation.

Referring to FIG. 2, at S204 the second UE 1062 provides its location (or position information) and, optionally, UE receiving capabilities to the first UE 106. In one example, the second UE 1062 may provide the location and UE receiving capabilities as part of PC5-RRC exchanges.

At S206, the third UE 1063 performs a SL transmission (PSSCH transmission) including the $2^{nd}$ stage SCI format to, for example, the fourth UE 1064. As discussed above, the $2^{nd}$ stage SCI format includes, among other things, position information for the third UE 1063 and SCI beam information (e.g., including beam width and/or beam direction) for the transmission by the third UE 1063. As noted above, the first UE 106 is able to sense the PSSCH transmission by the third UE 1063, obtains and decodes the $2^{nd}$ stage SCI format (including, among other things, the beam information) for the SL transmission by the third UE 1063.

At S208, the first UE 106 selects SL transmission resources on which to transmit to the second UE 1062 based at least partially on the $2^{nd}$ stage SCI format, including the beam information, from the third UE 1063. In one example, in selecting the SL transmission resources, the first UE 106 determines whether to include the transmission resources in use by (or allocated to) the SL transmission from the third UE 1063 (as indicated by the beam information) in the resource candidate set based on at least the beam information included in the $2^{nd}$ stage SCI from the third UE 1063. Step S208 in FIG. 2 will be discussed in more detail later with regard to FIG. 3.

Still referring to FIG. 2, once having selected the SL transmission resources from the resource candidate set, at S210 the first UE 106 transmits to the second UE 1062 on the selected SL transmission resources.

Figure 3:
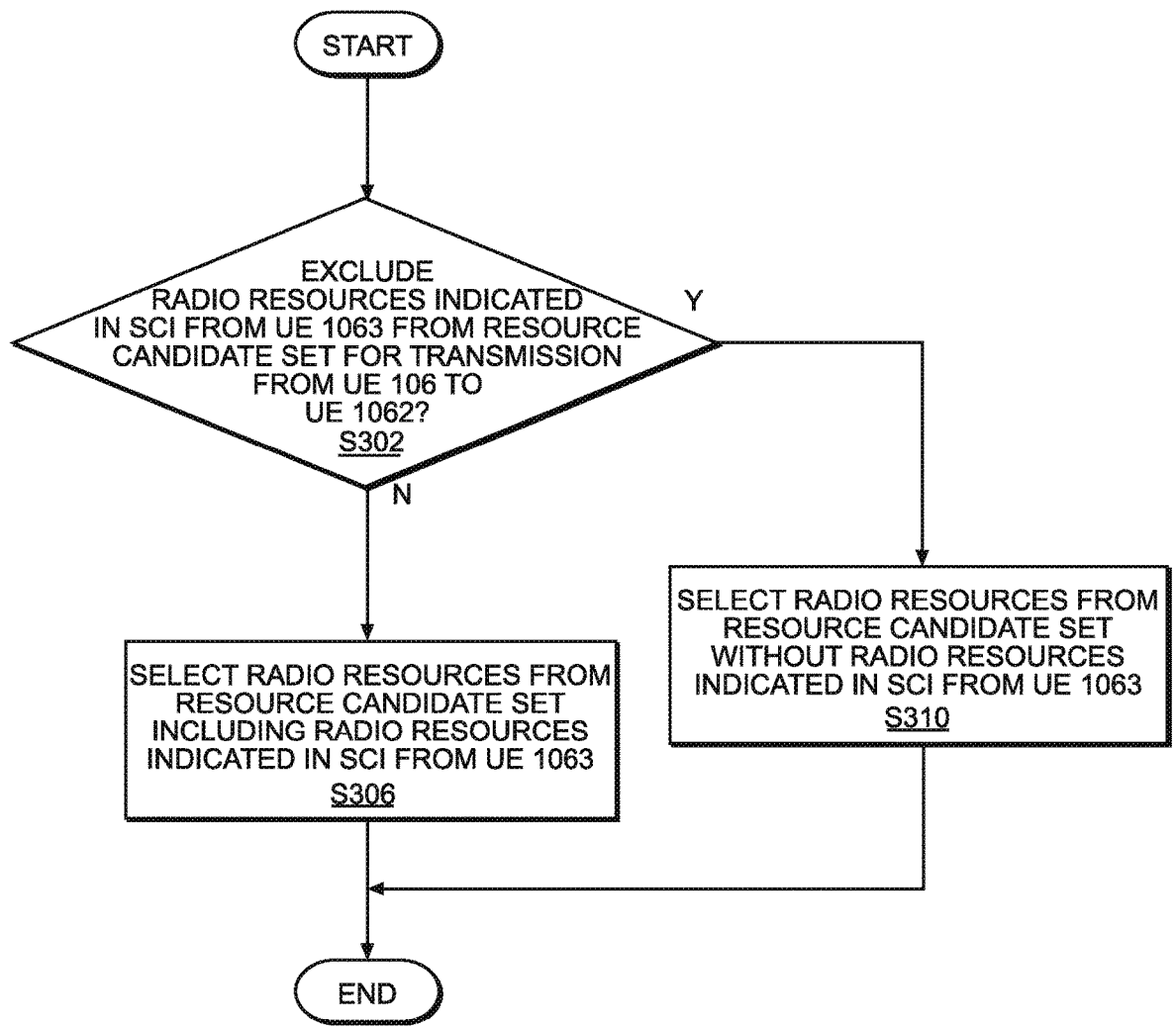
FIG. 3 is a flow chart illustrating a method according to example embodiments.

FIG. 3 is a flow chart illustrating a method for selecting SL transmission resources for transmission by the first UE 106 to the second UE 1062, according to example embodiments.

Referring to FIG. 3, at step S302 the first UE 106 determines whether to exclude transmission resources in use by the third UE 1063 from the resource candidate set for SL transmission to the second UE 1062.

In one example, the first UE 106 determines whether to exclude the SL transmission resources in use by the third UE 1063 based on the position information for the second UE 1062 and the beam information included in the $2^{nd}$ stage SCI from the third UE 1063. As noted above, the beam information may include the beam direction and/or beam width for SL transmissions from the third UE 1063. The first UE 106 uses its own transmit (Tx) beam information and the beam information from UE 1063 to predict the potential interference impact to the position at the second UE 1062. This prediction is conducted based on predicted RSRP estimation. If the first UE 106 determines that the SL transmission resources in use by the third UE 1063 is likely to interfere with reception of SL transmissions at the second UE 1062 (e.g., the predicted RSRP of UE 1063's transmission at UE 1062 is above a threshold value, with the threshold depending on the predicted RSRP of UE 106's transmission at UE 1062), then the first UE 106 determines that the SL transmission resources in use by the third UE 1063 should be excluded (or filtered out) from the resource candidate set for SL transmission from the first UE 106 to the second UE 1062. On the other hand, if the first UE 106 determines that the SL transmission resources in use by the third UE 1063 is unlikely to interfere with reception of SL transmissions at the second UE 1062 (e.g., the predicted RSRP of UE 1063's transmission at UE 1062 is below a threshold value, with the threshold depending on the predicted RSRP of UE 106's transmission at UE 1062), then the first UE 106 determines that the SL transmission resources in use by the third UE 1063 should be included in the resource candidate set for SL transmission from the first UE 106 to the second UE 1062.

If the second UE 1062 has indicated its receive (Rx) beamforming or spatial interference suppression capabilities in the signaling at S204 in FIG. 2, then the first UE 106 may take these capabilities into account in addition to the beam information for the third UE 1063, position of the third UE 1063, position of the second UE 1062, position of the first UE 106, etc., in determining whether to exclude the SL transmission resources in use by the third UE 1063 from the resource candidate set. For example, the first UE 106 may determine whether the second UE 1062 may be able to suppress the interference caused by the SL transmission by the third UE 1063 based on the Rx beamforming or spatial interference suppression capabilities of the second UE 1062. If the second UE 1062 is able to suppress the interference caused by the SL transmission by the third UE 1063, then the first UE 106 may include the SL transmission resources in use by the third UE 1063 (spatial reuse) in the resource candidate set for SL transmission from the first UE 106 to the second UE 1062. Otherwise, the first UE 106 may exclude the SL transmission resources from the resource candidate set for SL transmission from the first UE 106 to the second UE 1062.

In another example, the first UE 106 may determine whether to exclude SL transmission resources in use by the third UE 1063 from the resource candidate set based on the transmission power of the third UE 1063 received at the first UE 106 and one or more RSRP thresholds. In this case, the first UE 106 may estimate the potential interference at the second UE 1062 generated from SL transmission by the third UE 1063 (e.g., in any known manner), and determine that the SL transmission resources in use by the third UE 1063 should be excluded from the resource candidate set based on the estimated potential interference.

Unlike the existing procedure described in section 8.1 of 3GPP TS 38.214, according to at least this example embodiment, the first UE 106 attempts to estimate a size of the sidelink RSRP (SL-RSRP) received at the second UE 1062 (e.g., a size of the interference power at the second UE 1062), rather than the SL-RSRP at the first UE 106, and compares this estimated interference power with the one or more RSRP thresholds to determine whether to exclude SL transmission resources in use by the third UE 1063 from the resource candidate set.

Returning to FIG. 3, if the first UE 106 determines that the SL transmission resources in use by the third UE 1063 should be excluded from the resource candidate set at step S302, then at step S310 the first UE 106 excludes (or filters out) these SL transmission resources, and selects the SL transmission resources for transmission to the second UE 1062 from the resource candidate set without the SL transmission in use by the third UE 1063. The first UE 106 may select the SL transmission resources from the resource candidate set in any well-known manner. As such, further discussion is omitted for the sake of brevity.

Returning to step S302, if the first UE 106 determines that the SL transmission resources in use by the third UE 1063 should be included in the resource candidate set for SL transmission from the first UE 106 to the second UE 1062, then at step S306 the first UE 106 selects the SL transmission resources for transmission to the second UE 1062 from the resource candidate set including the SL transmission resources in use by the third UE 1063.

Figure 4:
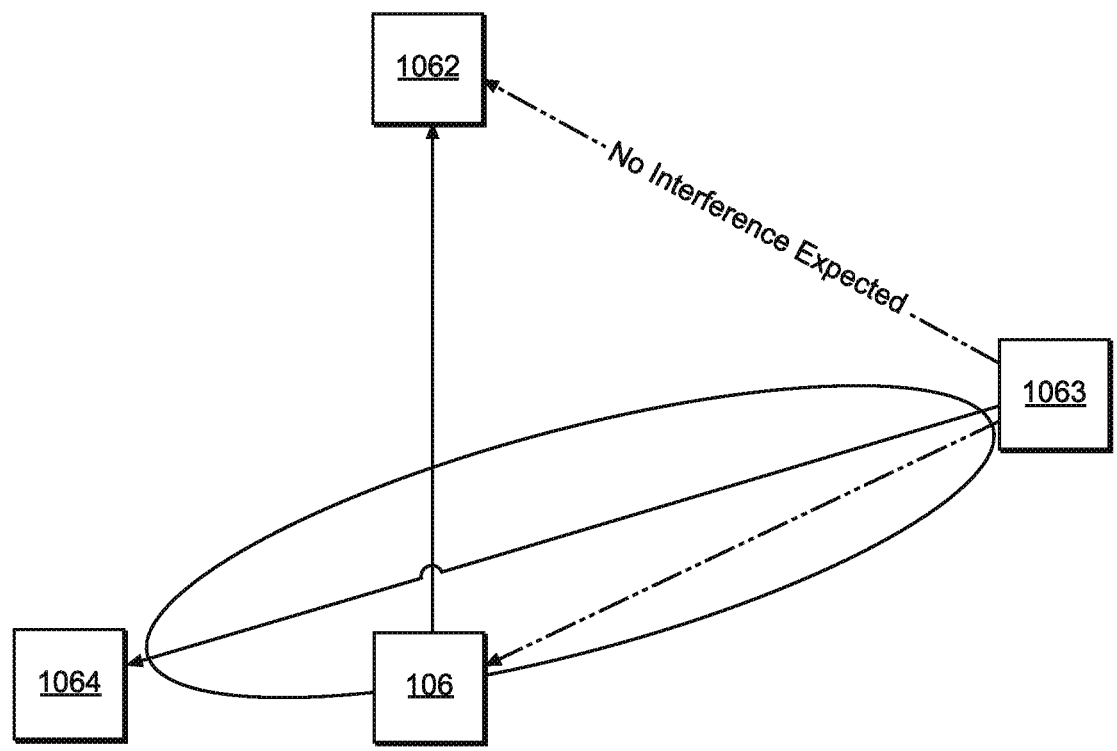
FIG. 4 illustrates an example implementation and/or use for example embodiments.
Figure 5:
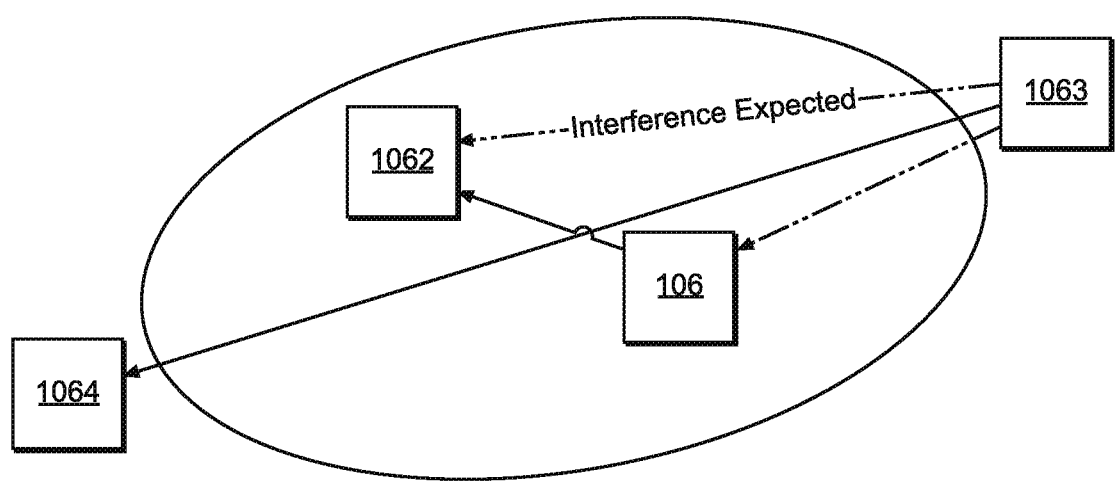
FIG. 5 illustrates another example implementation and/or use for example embodiments.

An example use of the proposed procedure is depicted in FIGS. 4 and 5, which illustrate example implementations and/or uses for the $2^{nd}$ stage SCI by the first UE 106 to predict if the transmission from the third UE 1063 to the fourth UE 1064 will cause interference to the second UE 1062.

In FIG. 4, the beam direction and beam width indicated in the $2^{nd}$ stage SCI from the third UE 1063 informs the first UE 106 that the third UE 1063 transmission is not likely to interfere with the second UE 1062. In this case, the first UE 106 includes the SL transmission resources in use by the third UE 1063 in the resource candidate set for transmission to the second UE 1062.

In FIG. 5, the beam direction and beam width indicated in the $2^{nd}$ stage SCI from the third UE 1063 informs the first UE 106 that the third UE 1063 transmission is likely to interfere with the second UE 1062. In this case, the first UE 106 excludes the SL transmission resources in use by the third UE 1063 from the resource candidate set for transmission to the second UE 1062.

Figure 6:
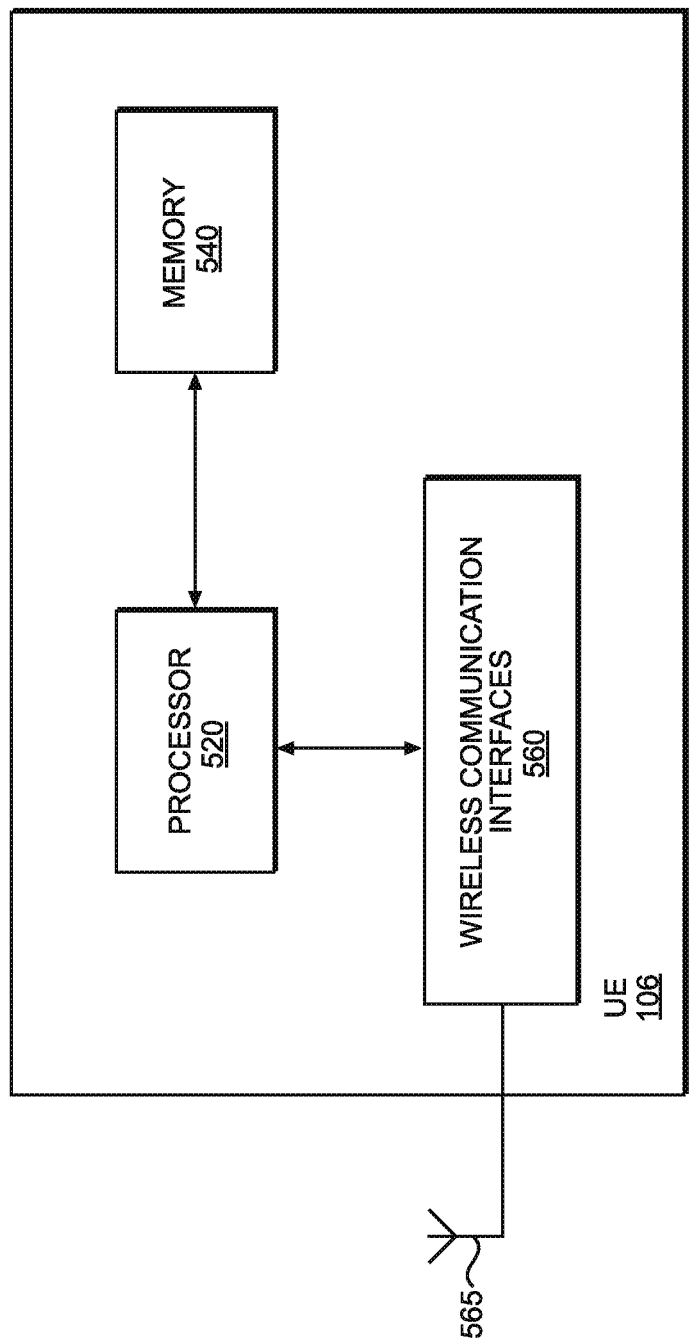
FIG. 6 is a block diagram illustrating an example embodiment of a user equipment.

FIG. 6 illustrates an example embodiment of one or more of the UEs shown in FIGS. 1, 4 and/or 5. The structure shown in FIG. 6 may also be representative of other network elements, such as gNB 102, TRPs 102A, 102B and/or 102C shown in FIG. 1. For the sake of brevity, however, FIG. 6 will be described with regard to the first UE 106.

As shown, the first UE 106 includes: a memory 540; a processor 520 connected to the memory 540; various interfaces 560 connected to the processor 520; and one or more (e.g., a plurality of) antennas or antenna panels 565 connected to the various interfaces 560. The various interfaces 560 and the antenna 565 may constitute a transceiver for transmitting/receiving data from/to other network elements (e.g., other UEs, gNB 102, TRPs 102A, 102B, 102C, etc.) via one or more antenna beams. As will be appreciated, depending on the implementation of the UE, the UE may include many more components than those shown in FIG. 6. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the UE to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, or other input/output components. As will be understood, the various interfaces 560 and programs stored in the memory 540 to set forth the special purpose functionalities of the UE will vary depending on the implementation of the UE.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, or other network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment comprising:
   at least one processor; and
   at least one memory including computer program code, the at least one memory and the computer program code configured to, with the at least one processor, cause the user equipment to
   receive beamforming and interference rejection capability information for a first user equipment, wherein the beamforming and interference rejection capability information indicates whether the first user equipment is capable of performing beamforming and interference rejection,
   select radio resources for a first sidelink transmission to the first user equipment based on the beamforming and interference rejection capability information and sidelink control information from a second user equipment, the sidelink control information including at least beam information for a second sidelink transmission by the second user equipment,
   wherein the sidelink control information includes at least one of beam width or beam direction for the second sidelink transmission and the beam direction is in one or two dimensions, and
   perform the first sidelink transmission to the first user equipment on the selected radio resources.

2. The user equipment of claim 1, wherein the sidelink control information is included in first stage sidelink control information, second stage sidelink control information, or a MAC control element.

3. The user equipment of claim 1, wherein the sidelink control information includes beam width and beam direction for the second sidelink transmission, and the beam width and beam direction for the second sidelink transmission are encoded in a beam width and direction field of the sidelink control information.

4. The user equipment of claim 2, wherein the second stage sidelink control information includes position information for the second user equipment, the position information being indicated by a Zone ID field of the second stage sidelink control information.

5. The user equipment of claim 1, wherein the second sidelink transmission is from the second user equipment to a third user equipment.

6. A method for sidelink transmission from a first user equipment to a second user equipment, the method comprising:
   receiving, at the first user equipment, beamforming and interference rejection capability information for the second user equipment, wherein the beamforming and interference rejection capability information indicates whether the second user equipment is capable of performing beamforming and interference rejection,
   selecting, at the first user equipment, radio resources for a first sidelink transmission to the second user equipment based on the beamforming and interference rejection capability information and sidelink control information from a third user equipment, the sidelink control information including at least beam information for a second sidelink transmission by the third user equipment,
   wherein the sidelink control information includes at least one of beam width or beam direction for the second sidelink transmission and the beam direction is in one or two dimensions, and
   performing the first sidelink transmission from the first user equipment to the second user equipment on the selected radio resources.

* * * * *